United States Patent
Aoyama et al.

(10) Patent No.: US 11,867,853 B2
(45) Date of Patent: Jan. 9, 2024

(54) NEUTRON DETECTOR, PERSONAL DOSEMETER AND NEUTRON FLUENCE MONITOR INCLUDING THIS DETECTOR AND NEUTRON DETECTION METHOD

(71) Applicants: FUJI ELECTRIC CO., LTD., Kawasaki (JP); Takashi Nakamura, Tokyo (JP)

(72) Inventors: Kei Aoyama, Hachioji (JP); Yohei Abe, Kunitachi (JP); Tomoya Nunomiya, Hino (JP); Masataka Narita, Hachioji (JP); Takashi Nakamura, Tokyo (JP)

(73) Assignees: FUJI ELECTRIC CO., LTD., Kawasaki (JP); TAKASHI NAKAMURA, Tokyo (JP)

( * ) Notice: Subject to any disclaimer, the term of this patent is extended or adjusted under 35 U.S.C. 154(b) by 0 days.

(21) Appl. No.: 17/752,977

(22) Filed: May 25, 2022

(65) Prior Publication Data

US 2023/0035938 A1 Feb. 2, 2023

(30) Foreign Application Priority Data

Jul. 20, 2021 (JP) .................... 2021-119672

(51) Int. Cl.
*G01T 3/08* (2006.01)
*G01T 1/16* (2006.01)

(52) U.S. Cl.
CPC ..... *G01T 3/08* (2013.01); *G01T 1/16* (2013.01)

(58) Field of Classification Search
CPC ................... G01T 3/08; G01T 1/16
See application file for complete search history.

(56) References Cited

U.S. PATENT DOCUMENTS

| 5,321,269 A * | 6/1994 | Kitaguchi ............... G01T 3/08 250/252.1 |
| 5,940,460 A * | 8/1999 | Seidel ..................... G01T 3/08 376/153 |

(Continued)

FOREIGN PATENT DOCUMENTS

| JP | 6-16112 B2 | 3/1994 |
| JP | 2002267760 A | 9/2002 |

(Continued)

OTHER PUBLICATIONS

Neudos 13, Neutron and Ion Dosimetry Symposium, Krakow, Poland, May 14-19, 2017, "Development of Active Neutron Personal Dosimeter With Small Gamma-Ray Sensitivity Using Thin Silicon Neutron Sensor" (1 page).

(Continued)

*Primary Examiner* — Hugh Maupin

(57) ABSTRACT

A neutron detector having high sensitivity of detection for low energy neutrons is provided. The neutron detector 10 includes a detecting element including a Si semiconductor layer 2, a first electrode 1 formed on one main surface of the Si semiconductor layer 2 and a second electrode 4 formed on the other main surface of the Si semiconductor layer 2, in which the Si semiconductor layer 2 includes a P-type impurity region 2a in contact with the second electrode 4 and an N-type impurity region 2b in contact with the first electrode 1; and a radiator 8 arranged to face the first electrode 1. In addition, a personal dosemeter and a neutron fluence monitor including the same are provided.

10 Claims, 8 Drawing Sheets

(56) References Cited

U.S. PATENT DOCUMENTS

| | | |
|---|---|---|
| 6,423,972 B1 | 7/2002 | Fehrenbacher et al. |
| 2011/0266643 A1 | 11/2011 | Engelmann |
| 2011/0284755 A1 | 11/2011 | Stradins et al. |
| 2014/0061829 A1 | 3/2014 | Stradins et al. |
| 2021/0239865 A1* | 8/2021 | Bahadori .............. H01L 31/028 |

FOREIGN PATENT DOCUMENTS

| | | | |
|---|---|---|---|
| JP | 2018059861 A | 4/2018 | |
| WO | 2010087844 A1 | 8/2010 | |

OTHER PUBLICATIONS

Extended European Search Report dated Nov. 21, 2022 in related European Patent Application No. 22176061.4 (12 pages).

S. Agosteo et al.; "Performance of a Neutron Spectrometer Based on a Pin Diode"; Radiation Protection Dosimetry (2005), vol. 116, No. 1-4, pp. 180-184, doi:10.1093/rpd/nci102; (5 pages) (cited in NPL Item No. 1).

T. Slavicek et al.; "A thermal neutron detector based on planar silicon sensor with TiB2 coating"; 13th International Workshop on Radiation Imaging Detectors, Jul. 3-7, 2011, ETH Zurich, Switzerland; published: Jan. 12, 2012; doi: 10.1088/1748-0221/07/01/C01053; (7 pages) (cited in NPL Item No. 1).

European Office Action issued in European Patent Application No. 22 176 061.4 dated Jul. 20, 2023.

European Office Action issued in European Patent Application No. 22 176 064.1 dated Jul. 20, 2023.

* cited by examiner

NEUTRON DETECTOR, PERSONAL DOSEMETER AND NEUTRON FLUENCE MONITOR INCLUDING THIS DETECTOR AND NEUTRON DETECTION METHOD

CROSS-REFERENCE TO RELATED APPLICATION

This application claims priority from Japanese Patent Application No. 2021-119672, filed on Jul. 20, 2021, which is incorporated herein by reference in their entirety.

BACKGROUND OF THE INVENTION

Field of the Invention

The present invention relates to a neutron detector, to a personal dosemeter and to a neutron fluence monitor including this detector, and relates to neutron detection method. In particular, the present invention relates to an inverted-type neutron detector which can detect recoil protons, alpha rays and tritons in response to incidence of low energy neutrons, with high sensitivity, a personal dosemeter and a neutron fluence monitor including this detector, and neutron detection method.

Description of Related Art

Neutrons are detected and quantified in various fields, such as in nuclear energy, in industry, in medicine, and so on. In the field of nuclear energy, for example, small and portable electronic personal dosemeters are used for the purpose of monitoring neutron dose equivalent of workers in nuclear power plants.

Conventionally, personal neutron dosemeters having a semiconductor detecting element have been known (see, for example, Patent Literature 1). The personal neutron dosemeter disclosed in Patent Literature 1 has a first detector having a radiator which is arranged immediately in front of a semiconductor detecting element and from which protons are emitted upon entry of neutrons in order to take out an output signal in response to neutrons having relatively high energy from the detecting element, and a second detector having a semiconductor detecting element coated with concentrated $^{10}$B (boron 10) and radiator which is arranged immediately in front of the semiconductor, in which the second detector is covered with a neutron moderator in order to extract from the detecting element an output signal in response to neutrons having relatively low energy.

In the dosemeter described in Patent Literature 1, a polyethylene radiator placed on a Si semiconductor diode having a standard thickness of about 400 μm is used as a detecting element in the first detector. FIG. 8 is a view illustrating a schematic cross-sectional structure of a conventional detector. Referring to FIG. 8, a detector 100 is composed of an anode 101 formed on one side of a Si semiconductor layer 102 and a cathode 104 formed on the other side. A SiO$_2$ film 105 is formed around the cathode 104 and a protection layer 108 is stacked on the cathode 104 and the SiO$_2$ film 105. The Si semiconductor layer 102 is composed of a P-type impurity region 102a and an N-type impurity region 102b. The anode 101 has two layers 101a, 101b. An electrode 107 is connected to the anode 101 with Ag paste 106. A radiator 110 is provided to face the cathode 104. The cathode 104 and the electrode 107 are connected to a terminal S and G provided on a housing P. When neutron "n" enters into the radiator 110 under these conditions, neutrons collide with hydrogen atoms in, for example, polyethylene constituting the radiator due to the H (n,n') reaction, causing momentum exchange between neutron and H. Then protons having nearly the same energy with neutrons are recoiled and the recoiled protons enter into the element from the cathode 104 in FIG. 8. The protons which injected into the element collide with Si atoms in the depletion layer and ionize Si, enabling the resulting charge to be detected.

Radiation such as gamma rays may enter into the detecting element with protons in some cases, and charge resulting from ionization of Si caused by gamma rays is also detected. When detection of neutrons is intended, such charges caused by gamma rays result in erroneous detection. Conventionally, to avoid erroneous detection, for the measurement of the amount of charge, a certain energy threshold of 1,100 keV has been set, and the number of pulses with an energy equal to or greater than the threshold has been measured as the neutron dose. However, since neutrons with energy lower than the threshold are excluded from the number of measured pulses, the dose of low energy neutrons has been measured by a boron radiator composed of the second Si semiconductor diode coated with $^{10}$B which is sensitive only to low energy neutrons.

CITATION LIST

Patent Literature

[Patent Literature 1] Japanese Patent Publication No. 6-016112

SUMMARY OF THE INVENTION

At the site of measurement of neutrons, there is a strong demand for measurement of neutrons in the energy of 0.5 MeV to 1 MeV, considering management of health and safety. However, the threshold energy of polyethylene radiator elements which avoids erroneous detection of gamma rays is greater than 1 MeV, and thus, a problem is that the sensitivity of boron radiator is reduced for neutrons from low energy up to 0.5 MeV to 1 MeV. A semiconductor neutron detector which provides sufficient sensitivity in the region of about 0.5 MeV to 1 MeV is required.

The present inventors have conducted intensive research and arrived at the idea of thinning the semiconductor element and providing the incident surface for neutrons on the side opposite to that in conventional art, and have thus completed the present invention.

Accordingly, an embodiment of the present invention is a neutron detector including: a first detecting element including a Si semiconductor layer, a first electrode formed on one main surface of the Si semiconductor layer and a second electrode formed on the other main surface of the Si semiconductor layer, wherein the Si semiconductor layer includes a P-type impurity region in contact with the second electrode and an N-type impurity region in contact with the first electrode; and a radiator arranged to face the first electrode.

It is preferable that, in the neutron detector, the Si semiconductor layer have a thickness of not greater than 100 μm.

It is preferable that, in the neutron detector, the first electrode include a stacked body of Al and Ti, and Ti be provided in contact with the Si semiconductor layer.

It is preferable that the neutron detector be used for detecting neutrons with energy of 0.5 MeV to 1 MeV.

It is preferable that, in the neutron detector, the radiator include a compound containing $^{10}$B or $^{6}$Li and/or a polymer compound containing a hydrogen atom.

It is preferable that, in the neutron detector, the radiator include a compound containing $^{10}$B or $^{6}$Li, the neutron detector further include a second detecting element on the side opposite to the first detecting element with the radiator interposed therebetween, and the first electrode of the first detecting element be arranged to face the first and second main surfaces of the radiator, and the first electrode of the second detecting element be arranged to face the second main surface of the radiator.

Another embodiment of the present invention relates to a personal dosemeter including the neutron detector according to any one of the above.

Still another embodiment of the present invention relates to a neutron fluence monitor including the neutron detector according to any one of the above.

Yet another embodiment of the present invention relates to a neutron detection method using the neutron detector according to any one of the above, including the steps of: allowing a charged particle produced from incidence of neutron to enter into a depletion layer formed in the N-type impurity region from the side of the first electrode; and detecting charge generated in the depletion layer.

Advantageous Effects of Invention

The neutron detector of the present invention can measure neutrons ranging from thermal neutrons with a kinetic energy of about not less than 0.025 eV to neutrons with a kinetic energy up to about 15 MeV, which are important for management of personal dose equivalent without the influence of gamma rays. In particular, the neutron detector can detect neutrons with a relatively low energy of 0.5 MeV to 1 MeV at high sensitivity. The present invention also provides a neutron dosemeter and a neutron fluence monitor including the neutron detector. They ensure safety in nuclear power plants and accelerator facilities and can also be used for dose management for flight crews and space crews. Furthermore, use of the detector for dose assessment in a medical treatment enables more accurate therapy.

DESCRIPTION OF PREFERRED EMBODIMENTS

Hereinafter, embodiments of the present invention will be described with reference to the figures. However, the present invention is not limited by the embodiments described below.

[1] Inverted-Type Neutron Detector

Figure 1:
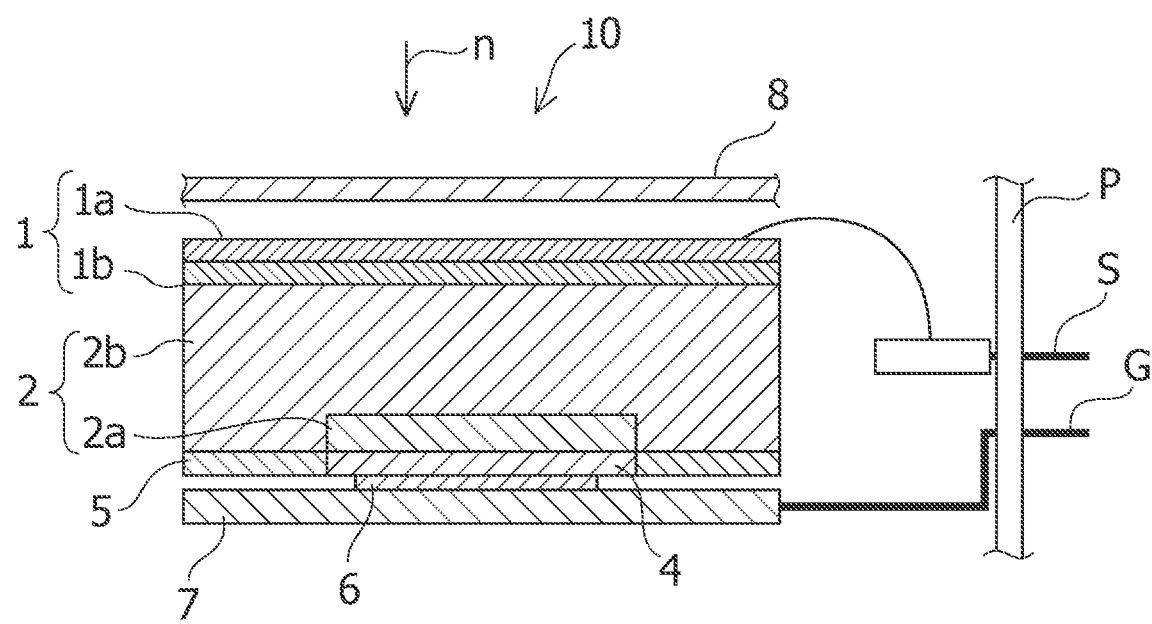
FIG. 1 is a schematic cross-sectional view illustrating the structure of the inverted-type neutron detector according to an embodiment of the present invention.

A first embodiment of the present invention relates to a neutron detector. FIG. 1 is a schematic cross-sectional view of the neutron detector. Referring to FIG. 1, the neutron detector 10 has a detecting element and a radiator 8. In the neutron detector according to the present embodiment, the incident surface of neutrons is located on the side opposite from the detecting element compared to conventional neutron detectors. Thus, the neutron detector according to the present embodiment is also referred to as an "inverted-type neutron detector" in the present description.

The detecting element has a silicon (Si) semiconductor layer 2 and the first electrode 1 formed on one main surface of the Si semiconductor layer 2 and the second electrode 4 formed on the other main surface of the Si semiconductor layer 2. A P-type impurity region 2a in contact with the second electrode 4 and an N-type impurity region 2b in contact with the first electrode 1 are formed in the Si semiconductor layer 2. The third electrode 7 is connected to the second electrode 4 through a conductive bonding material 6. A positive terminal S is connected to the first electrode 1 and a negative terminal G is connected to the second electrode 4 through the third electrode 7. A voltage application unit, which is not shown, is optionally connected to the positive terminal S and the negative terminal G.

The first electrode 1 is formed on one main surface of the Si semiconductor layer 2 to constitute one main surface of the detecting element, and functions as the incident surface of charged particles produced by neutrons. The charged particles produced by neutrons, as used herein, refer to charged particles generated in a compound constituting the radiator by neutrons, which are primarily protons, alpha rays, and tritons. Tritons may be described as "$^{3}$H" or "t." Since neutrons cannot be directly measured, the charge of those charged particles is detected in the detecting element.

The first electrode 1 is an anode of diode and may be a metal electrode. The first electrode 1 may have a single layer structure of a single metal or may have a multilayer structure in which two or more metal thin layers having a different composition are stacked. When the first electrode 1 has a single layer structure, the first electrode 1 may be selected from, for example, aluminum (Al), titanium (Ti), and silver (Ag). Ti, which has small leak current, is preferred. The first electrode 1 may have a thickness of about 0.01 µm to 5.0 µm, and preferably about 0.05 µm to 2 µm. Although leak current may be increased in electrodes having a single layer structure compared with the electrode having a multilayer structure, described later, the first electrode may have a single layer structure when the leak current is not detected as noise. For example, a first electrode 1 having a single layer structure may be used in the detecting element which detects recoil protons in high energy regions.

FIG. 1 illustrates a first electrode 1 having a double layer structure. In this case, it is preferable that the incident surface of charged particles produced by neutrons is an Al electrode 1a and the surface in contact with the Si semiconductor layer is a Ti electrode 1b. This is because when the Ti electrode 1b is in contact with the Si semiconductor layer, good electrical contact is maintained and leak current is reduced. Furthermore, coating the Ti electrode 1b with the Al electrode 1a can prevent oxidization of the Ti electrode 1b in air. A gold (Au) electrode may also be used as the surface electrode instead of the Al electrode 1a or in addition to the Al electrode 1a. When a soldering material is used as the conductive bonding material 6, described later, it is necessary to provide an Au electrode. The Al electrode 1a may have a thickness of 0.01 μm to 5.0 μm, preferably about 0.05 μm to 2 μm. The Ti electrode 1b may have a thickness of 0.01 μm to 5.0 μm, preferably about 0.05 μm to 2 μm. When the first electrode is composed of a metal electrode having three or more layers, the thickness of the respective layers may be the same as the preferred thickness of the above Al electrode 1a or the Ti electrode 1b.

The Si semiconductor layer 2 may be a semiconductor layer made of a silicon (Si) crystal. The crystal may be, for example, a monocrystal prepared by the Czochralski, i.e., Cz method; a monocrystal prepared by the floating zone, i.e., FZ method; or an epitaxial thin film prepared by epitaxial growth on a substrate, and it is not particularly limited. The Si semiconductor layer 2 may have a thickness of not greater than 100 μm, and preferably not greater than 60 μm. It is preferable that the Si semiconductor layer 2 have a thickness of about 40 μm. Furthermore, the Si semiconductor layer 2 has a thickness of at least 1 μm, preferably not less than 5 μm, and further preferably not less than 30 μm. The shape and the size of the main surface of the Si semiconductor layer 2 are not particularly limited. The Si semiconductor layer 2 may be rectangular with sides of about 0.5 cm to 3 cm, and for example, may be square with a size of about 1 cm. For the shape and the size of the main surface of the Si semiconductor layer 2, the Si semiconductor layer 2 may have a wafer size of 4 inches, 5 inches, 6 inches, or 8 inches depending on the purpose of use.

The second electrode 4 is a cathode of diode and is formed in contact with another main surface of the Si semiconductor layer 2. The second electrode 4 may also be a metal electrode, and may be, for example, an Al electrode. The second electrode 4 may have a thickness of about 0.1 μm to 5 μm, preferably about 0.5 μm to 2 μm. An insulation film 5 may be formed around the second electrode 4. The insulation film 5 may be made of $SiO_2$.

The Si semiconductor layer 2 may be one having a PN junction. More specifically, a P-type impurity region 2a is formed in the region in contact with the second electrode 4. The P-type impurity region 2a may be formed of a layer to which a group 13 element, for example, boron (B), has been doped as an impurity. A P-type impurity region which forms a $P^+$ layer in which the amount of doped impurities is not less than $1\times10^{16}/cm^3$ is preferred. The amount of doped impurities is more preferably $1\times10^{17}/cm^3$ to $1\times10^{19}/cm^3$. The $P^+$ layer may have a thickness of 6 μm to 8 μm, but the thickness is not limited to a specific thickness. The other region of the Si semiconductor layer 2 may be an N-type impurity region 2b. It is preferable that the N-type impurity region 2b is a layer to which a group 15 element, for example, phosphorus (P), has been doped as an impurity at a very low concentration. The amount of doped impurity (P) is, for example, preferably not more than $1\times10^{13}/cm^3$, and is more preferably $1\times10^{12}/cm^3$ to $5\times10^{12}/cm^3$.

In the Si semiconductor layer 2, a depletion layer (not shown) is formed in the region of the interface of the PN junction, which is in contact with the P-type impurity region 2a. The depletion layer may be extended by applying a reverse voltage between the first electrode 1 and the second electrode 4. When operating the neutron detector 10, the width of the depletion layer may be extended to the entire region in the direction of thickness of the Si semiconductor layer 2, i.e., to the site near the first electrode 1. The width of the depletion layer may be increased or decreased depending on the voltage applied. Details of conditions will be described later.

The third electrode 7 is bonded to the second electrode 4 with the conductive bonding material 6. A binder containing precious metal particles such as Ag paste or a soldering material may be used as the conductive bonding material 6. The third electrode 7 may also be a metal electrode, and the electrode may be copper (Cu) on which gold (Au) plating is formed, or Al. The thickness of the third electrode 7 is not limited. In an embodiment, the second electrode may be directly bonded to a terminal without the third electrode or the conductive bonding material, although this is not shown in the figure. The third electrode 7 may serve as a substrate supporting the detecting element.

The first electrode 1 is connected to the positive terminal S. The second electrode 4 is connected to the negative terminal G through the third electrode 7. The terminals may be configured so that reverse bias may be applied to a diode when operating the neutron detector 10. However, since the depletion layer has been formed, detection can be performed without applying voltage between the terminals.

It is preferable that a $P^+$ layer and an i layer are formed, but a $N^+$ layer is not formed between the first electrode 1 and the second electrode 4 in the neutron detector 10 shown in the figure. However, a thin $N^+$ layer having a thickness of for example, 0.1 μm to 20 μm, preferably 0.5 μm to 3.0 μm, and further preferably about 1 μm to 2 μm, may optionally be formed in contact with the first electrode 1. The thickness of the $N^+$ layer varies depending on the type of charged particles to be detected. It is preferable that the thickness is, in particular, about 1 μm to 3 μm, for the purpose of detecting alpha rays. In that case, the $N^+$ layer may be a region to which antimony (Sb) has been doped. The amount of doping of the impurity (Sb) may be $1\times10^{16}/cm^3$ to $1\times10^{19}/cm^3$.

The detecting element may be produced by a usual method for producing a PiN type or PN type diode. For example, the second electrode 4 is formed on the Si semiconductor layer 2 prepared by a usual method, and an $N^+$ type region is thinned or eliminated, if necessary, and the Si semiconductor layer 2 is also thinned to a desired thickness. The first electrode 1 is formed on the thinned Si semiconductor layer. The third electrode 7 may be optionally bonded to the second electrode 4 using a conductive bonding material 6.

A radiator 8 is provided to face the first electrode 1 of the detecting element. The radiator 8 may or may not be in contact with the first electrode 1, and may be provided at a position such that charged particles produced by neutrons which have entered into the radiator 8 can enter the first electrode 1. Thus, the radiator 8 may be provided, for example, in parallel to the surface of the first electrode 1 in a mode in which the radiator is supported by a housing described later. The distance between the radiator 8 and the first electrode 1 may be about not greater than 5 mm, and for example, may be about 1 mm to 2 mm, but it is not limited thereto.

A substance which converts incident neutrons into charged particles may be used for the radiator 8. A polymer compound containing a hydrogen atom (H) may be used for the radiator which converts incident neutrons to recoil protons. The polymer compound may be an organic polymer compound such as polyethylene or polypropylene, but it is not limited thereto. The radiator which generates recoil protons may have a thickness of about 1 mm. A compound containing boron ($^{10}$B) or lithium ($^{6}$Li) may be used for the radiator which converts incident neutrons into alpha rays and tritons. Examples of such compounds to be used include, but are not limited to, LiF, BN, and B$_4$C. The radiator which generates alpha rays or tritons may have a thickness of, for example, 0.01 µm to 100 µm, and preferably about 0.03 µm to 10 µm.

Both a radiator which generates recoil protons and a radiator which generates alpha rays and tritons may be arranged to face a detecting element. In that case, the two radiators can be arranged in a mode in which they are not overlapped, or preferably in a mode in which the two radiators are positioned on the same plane. By arranging both the radiator which generates recoil protons and the radiator which generates alpha rays and tritons, recoil protons, alpha rays, and tritons can enter into one detecting element, enabling all of these charges to be detected.

The neutron detector may optionally have a part for applying voltage between the first electrode 1 and the second electrode 4. A usual DC power source may be used for the part for applying voltage, and a small power source such as batteries may be used, but the type of power source is not limited.

Next the method of use and the function of the neutron detector 10 according to the present embodiment will be described. The neutron detector 10 according to the present embodiment is optionally stored in an appropriate housing P, and a detection circuit for detecting charged particles is connected.

When in use, reverse bias voltage may be applied to the neutron detector 10 to extend the depletion layer. The voltage may be not more than 10V, for example, 1 V to 8 V, preferably 1 V to 5 V, and more preferably 1 V to 3 V. Since the depletion layer is formed due to PN junction without applying voltage, detection may be performed even at 0 V. The preferred voltage may vary depending on the thickness of the Si semiconductor layer 2. The width of the depletion layer may be adjusted by the voltage applied. It is advantageous to form the depletion layer up to the surface in contact with the first electrode 1 in consideration of charge collection rate. Setting the voltage to the above range allows the depletion layer to be formed all over the Si semiconductor layer 2, except for the P-type impurity region 2a, to improve the charge collection rate.

When neutrons enter the radiator 8, charged particles such as recoil protons, alpha rays and tritons produced by neutrons in the radiator 8 enter into the Si semiconductor layer 2 together with electrons produced by gamma rays. This leads to interaction between charged particles and Si in the depletion layer. The detecting element according to the present embodiment can detect the charge generated. At that stage, incident charged particles lose energy at a constant rate due to interaction with Si, depending on the traveling distance. The traveling distance before complete absorption of energy is called Rp (range). Rp varies depending on the type of charged particles, and it is proportional to the energy possessed by incident charged particles. Rp of protons produced by neutrons with an energy of about 1 MeV is about 15 µm for Si. Thus, the sensitivity of detection in the detecting element having the Si semiconductor layer 2 having the above preferred thickness is not very different from that of a conventional detecting element having a Si semiconductor layer having a thickness of several hundred µm. In addition, Rp of gamma rays with an energy of about 1 MeV for Si is about $10^4$ µm to $10^5$ µm. Thus, by forming a thin detecting element, the probability of transmittance of gamma rays through the detecting element is increased in the wide energy range, and the transmittance of gamma rays having high energy approaches 100%. For this reason, by forming a thin detecting element having the above preferred thickness, neutrons in a low energy range can be detected without influence of gamma rays. Reduction of the influence of gamma rays makes it possible to prevent funneling effects, which is extension of the depletion layer caused by charges generated by gamma rays outside the depletion layer.

Furthermore, since the present embodiment has a configuration such that recoil protons, alpha rays, and/or tritons, which are charged particles generated due to incidence of neutrons, enter from the side of the first electrode 1, charged particles directly enter into the depletion layer. In conventional configurations, in some cases, charged particles which do not reach the depletion layer and remain in the P-type impurity region and the generated electron-hole pair disappear there and are not detected. The neutron detector according to the present embodiment allows charged particles to enter into the depletion layer, which is the sensitive volume, without being affected by the P-type impurity region to improve sensitivity of detection of neutrons.

[2] Sandwich-Type Neutron Detector

A second embodiment of the present invention relates to a neutron detector including at least two detecting elements with a radiator interposed therebetween, in which the first electrode of the at least two detecting elements is arranged to face the first main surface and the second main surface of the radiator. In the neutron detector according to the present embodiment, at least two detecting elements are arranged so as to sandwich the radiator. Thus, the neutron detector according to the present embodiment is also referred to as a "sandwich-type neutron detector."

Figure 2:
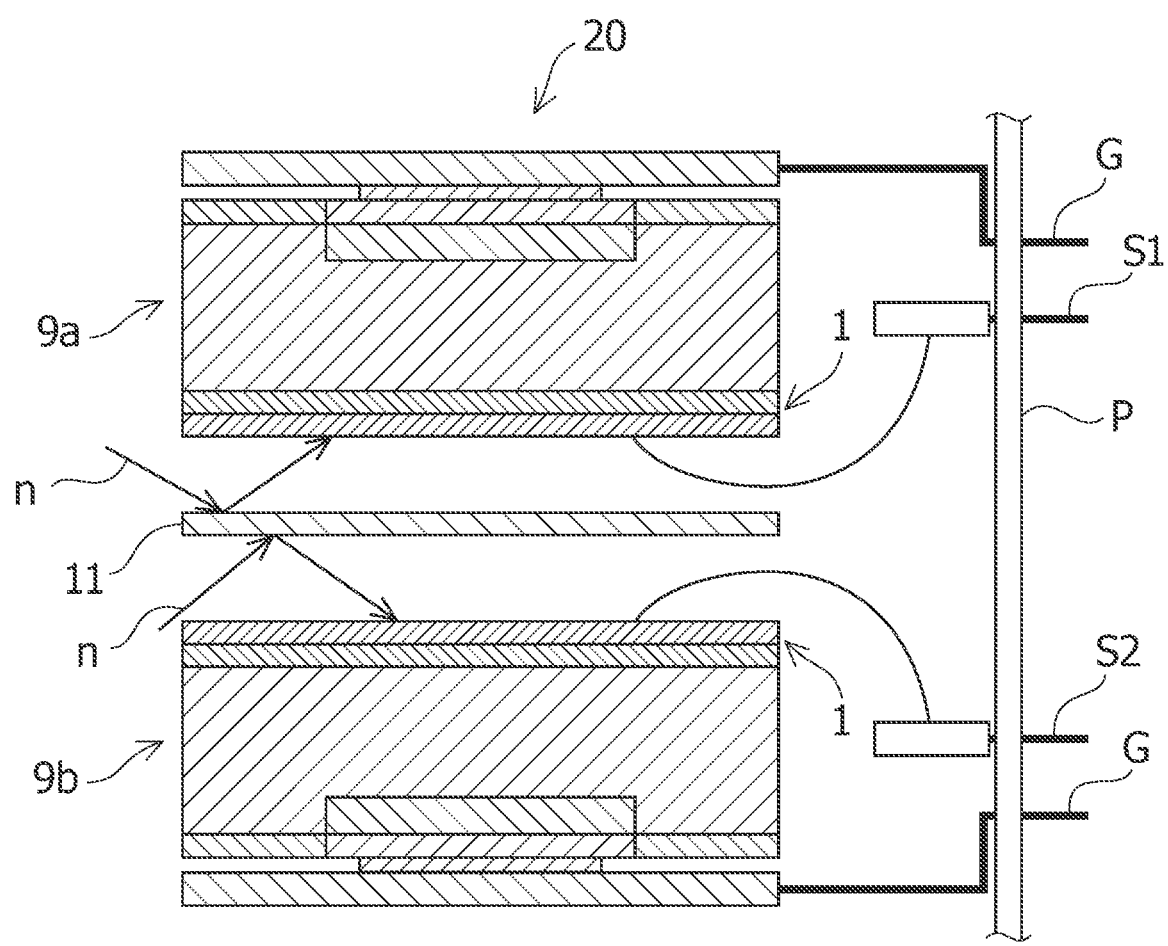
FIG. 2 is a schematic cross-sectional view illustrating the structure of a sandwich-type neutron detector according to an embodiment of the present invention.

FIG. 2 is a cross-section illustrating the sandwich-type neutron detector according to the present embodiment. Referring to FIG. 2, in the sandwich-type neutron detector 20, the first detecting element 9a and the second detecting element 9b are arranged in a mode in which the first electrodes 1 symmetrically face each other with the radiator 11 interposed therebetween. The configuration of the first detecting element 9a and the second detecting element 9b may be the same as that of the detecting element according to the first embodiment. It is preferable that the two detecting elements 9a, 9b have the same configuration.

The radiator 11 converts neutrons into alpha rays and tritons and allows them to enter into the first electrode 1 of the two detecting elements 9a, 9b. A thin-plate radiator composed of a compound containing $^{10}$B or $^{6}$Li, for example, LiF, BN, B$_4$C, and the like may be used as the radiator 11. The radiator 11 may have a thickness of, for example, 0.01 µm to 100 µm, and preferably about 0.03 µm to 10 µm.

It is preferable that the radiator 11 and the first electrode 1 of the first detecting element 9a and the second detecting element 9b are arranged so that all of their main surfaces are nearly parallel to each other. Furthermore, the radiator 11 and the respective first electrodes 1 of the first detecting element 9a and the second detecting element 9b may be in contact or be spaced apart. When they are spaced apart, the distance may be about not greater than 5 mm, and more preferably, for example, about 1 mm to 2 mm. FIG. 2 is a schematic view for illustrating the present invention, and the size of the respective materials and the distance between them are not as shown in the figure.

Next, the method of use of the sandwich-type neutron detector 20 according to the second embodiment, that is, the neutron detection method using the sandwich-type neutron detector 20, will be described. The sandwich-type neutron detector 20 may be also stored in an appropriate housing P. Reverse bias may be applied to the first detecting element 9a and the second detecting element 9b to extend the depletion layer if required in the same manner as for the neutron detector of the first embodiment. The range of the applied voltage may be the same as in the first embodiment. The voltage applied to the first detecting element 9a and the voltage applied to the second detecting element 9b are the same. Alpha rays and tritons are generated in the radiator 11 due to incident neutrons. Since alpha rays and tritons generated in the radiator 11 inevitably fly in opposite directions, they enter into either the first detecting element 9a or the second detecting element 9b with a probability of ½. The numbers of charged particles that have entered into the first detecting element 9a and the second detecting element 9b are counted in the respective detecting elements by the mechanism described in the first embodiment, enabling quantification of neutrons.

Although the sandwich-type neutron detector 20 shown in the figure is an example in which the first detecting element 9a and the second detecting element 9b face each other with one radiator 11 interposed between the first detecting element 9a and the second detecting element 9b, and three or more detecting elements may also be provided so as to face each other with one radiator interposed therebetween. That is, one, two, or more detecting elements may be provided on the first and the second main surfaces of the radiator, respectively.

When the sandwich-type neutron detector 20 according to the second embodiment is used, alpha rays and tritons flying in any direction can enter into the detecting elements 9a, 9b, because at least the first and the second detecting elements 9a, 9b are arranged with the radiator 11 therebetween. Thus, alpha rays and tritons can be detected, which flew onto the radiator 11 in the direction opposite to the detecting element and had not entered into the detecting element in a mode in which a detecting element is provided only on one surface of the radiator. Furthermore, sensitivity can be twice that of conventional detectors, and noise can be reduced by counting the output signal from the first and the second detecting elements 9a, 9b simultaneously. The sandwich-type neutron detector 20 according to the second embodiment can be particularly useful for the measurement of neutrons with an energy of not more than 1 MeV.

[3] Personal Dosemeter

A third embodiment of the present invention is a personal dosemeter including the inverted-type neutron detector according to the first embodiment or the sandwich-type neutron detector according to the second embodiment. More specifically, the personal dosemeter includes a first detecting system which detects fast neutrons with an energy of about 400 keV to 15 MeV and a second detecting system which detects low energy neutrons with energy of about 0.025 eV to 1 MeV. It is preferable that, in the dosemeter, at least the second system includes the inverted-type neutron detector according to the first embodiment or the sandwich-type neutron detector according to the second embodiment.

Figure 3:
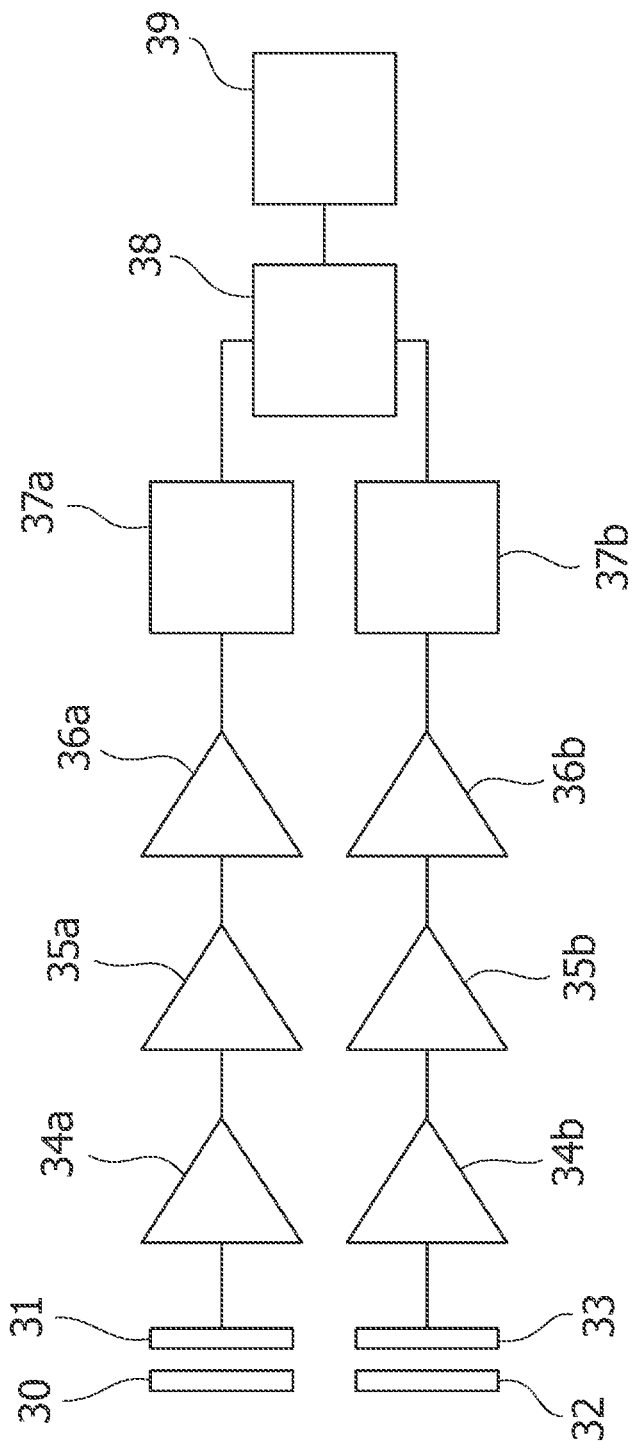
FIG. 3 is a functional block diagram of a personal dosemeter according to an embodiment of the present invention.

FIG. 3 is a functional block diagram illustrating the personal dosemeter according to the present embodiment. The personal dosemeter includes: the first detecting system including an inverted-type neutron detector 31 including a radiator 30, a preamplifier 34a, an amplifier for adjusting waveform 35a, a pulse height discriminator 36a and counter 37a; the second detecting system including an inverted-type neutron detector 33 including a radiator 32, a preamplifier 34b, an amplifier for adjusting waveform 35b, a pulse height discriminator 36b and counter 37b; an arithmetic unit 38; and a display 39.

Figure 8:
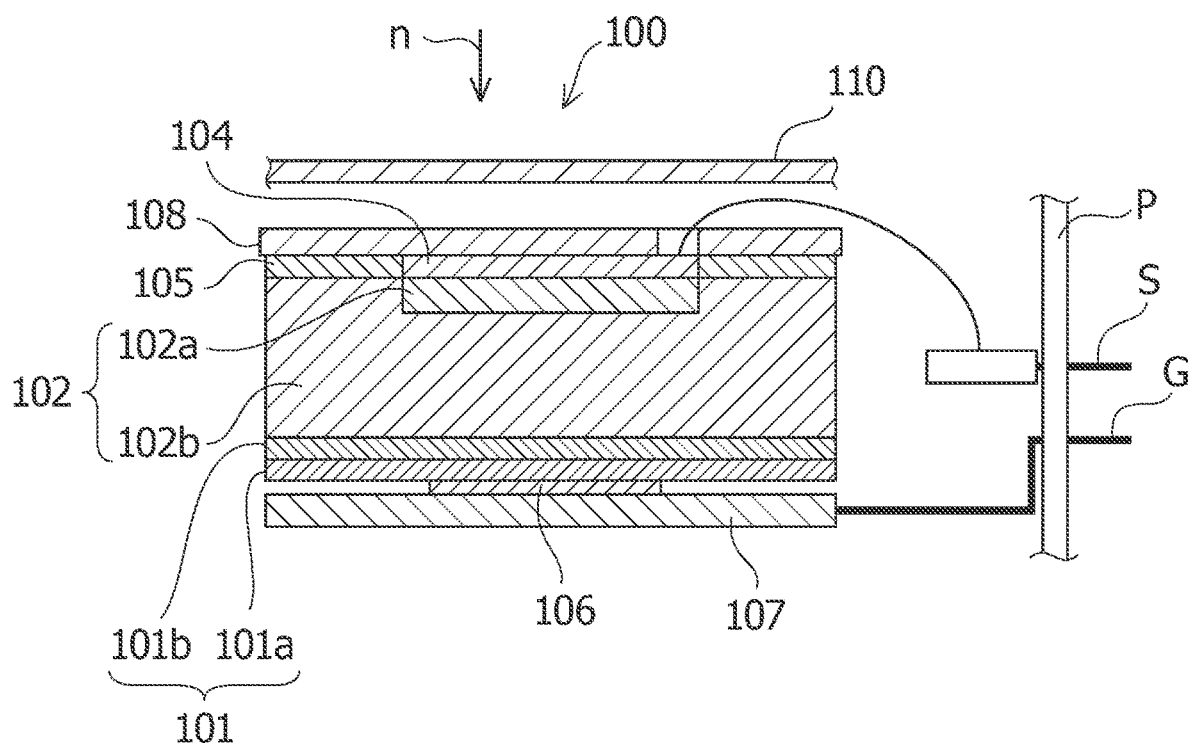
FIG. 8 is a schematic cross-sectional view illustrating the structure of a conventional neutron detector.

In the first detecting system, the neutron detector 31 may be the inverted-type neutron detector 10 shown in FIG. 1 or the conventional neutron detector 110 shown in FIG. 8. The radiator 30 may be the radiator described in the first embodiment. In the first detecting system, the neutron detector 31 detects protons recoiled from the radiator 30 due to the H (n,n') reaction of neutrons which entered from the front side of the radiator 30, and produces output pulses, and thus can respond only to fast neutrons with energy of about not less than 100 keV. In the second detecting system, the neutron detector 33 is the inverted-type neutron detector according to the first embodiment or the sandwich-type neutron detector according to the second embodiment.

The output from the neutron detector 31 in the first detecting system is input to the pulse height discriminator 36a through the preamplifier 34a and the amplifier for adjusting waveform 35a. In the pulse height discriminator 36a, unnecessary components under a certain discrimination level are removed, and only the desired components derived from neutrons are extracted. The components extracted are then input into the counter 37a. The output from the neutron detector 33 in the second detecting system is also input into the pulse height discriminator 36b through the preamplifier 34b and the amplifier for adjusting waveform 35b. Then unnecessary components under a certain discrimination level are removed in the pulse height discriminator 36b. By using the inverted-type and thin neutron detector 10 according to the first embodiment of the present invention, the discrimination level can be reduced to about 0.4 MeV from about 1.1 MeV of conventional technique. In other words, the threshold can be significantly reduced in comparison with conventional technique. However, the discrimination level may be set in the pulse height discriminator 36b, and it is not limited to specific values. Then the desired components derived from neutrons are extracted and input into the counter 37b. Calculation is performed in the arithmetic unit 38 so that characteristics of the outputs are close to the characteristics defined by the dose equivalent conversion curve provided by the International Commission on Radiological Protection, and the results are displayed on the display 39 so that they can be directly read. The entire measurement system including the electronic circuit is stored in a portable housing (not shown) to constitute a personal dosemeter.

The personal dosemeter according to the present embodiment can measure neutrons from thermal energy up to 15 MeV. In particular, the personal dosemeter is advantageous since it can detect neutrons with a relatively low energy of about 0.5 MeV to 1 MeV with high sensitivity.

[4] Neutron Fluence Monitor

A fourth embodiment of the present invention relates to a neutron fluence monitor including the inverted-type neutron detector according to the first embodiment. More specifically, the neutron fluence monitor is used for boron neutron capture therapy: BNCT in medical institutions, for monitoring, on site, fluence of a neutron beam with which a human body is irradiated. The neutron beam to be monitored and detected in the present embodiment is composed primarily of thermal neutrons, and the charged particles to be counted are mainly alpha rays and tritons.

Figure 4:
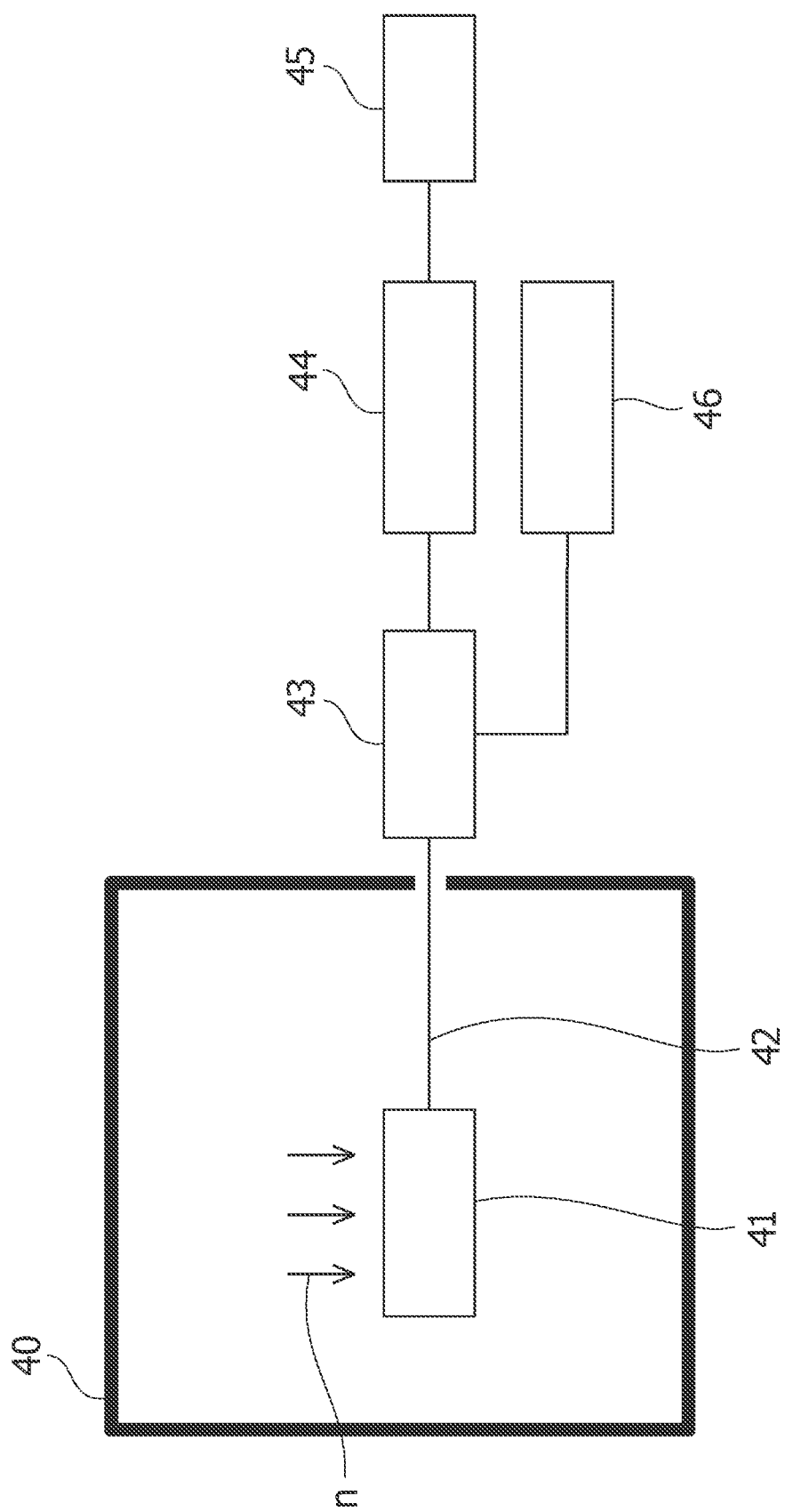
FIG. 4 is a functional block diagram of a neutron fluence monitor according to an embodiment of the present invention.

FIG. 4 is a functional block diagram illustrating the neutron fluence monitor according to the present embodiment. The neutron fluence monitor includes a neutron detector 41 provided in a BNCT apparatus 40, a preamplifier 43, a waveform processor 44 connected to a power source 46 and an arithmetic and display unit 35. The neutron detector 41 and the preamplifier 43 are connected by coaxial cable 42. They may be configured so that the results of detection are counted, calculated, and displayed in a place separated from the radiation controlled area in which the BNCT apparatus 40 is installed, for example, a remote control room for the BNCT apparatus 40. It is preferable to use the neutron detector 10 according to the first embodiment as the neutron detector 41. A compound containing $^{10}$B or $^6$Li can be used as the radiator.

The neutron detector 41 is installed near a neutron target (not shown), which emits a neutron beam, in the BNCT apparatus 40, and has a structure such that some of the scattered neutrons "n" can enter into the neutron detector 41 when a human body (not shown) is irradiated with neutron "n". The correlation between the amount of neutrons with which a human body is irradiated and the amount of scattered neutrons in the BNCT apparatus 40 is known. Thus, measurement of the amount of portion of the scattered neutrons enables fluence of a neutron beam to be monitored based on the correlation. The output from the neutron detector 41 is input to the waveform processor 44 through the preamplifier 43. Then the output is input to the arithmetic and display unit 45, which may be a computer and so on, and the results of detection may be displayed in the desired form in real time.

The neutron fluence monitor according to the present embodiment can detect and measure the amount of neutrons used in therapy in real time, and thus, can control the amount of neutrons irradiated during therapy. Furthermore, the monitor can always measure degrees of neutron fluence or can detect abnormal generation of neutrons in an early stage, and thus, can provide accurate information of neutron fluence in the boron neutron capture therapy.

EXAMPLES

Hereinafter the present invention will be described in detail with reference to Examples, but the present invention is not limited to the following Examples.

Example 1, Comparative Example 1

A neutron detector of Example 1 having the structure shown in FIG. 1 was produced. The thickness of the Si semiconductor layer 2 was set to 40 μm. A 0.1 μm thick Ti thin film was formed in contact with the Si semiconductor layer 2 as the first electrode 1, and a 0.5 μm thick Al thin film was formed on the outermost layer. A 1 μm thick Al thin film was formed as the second electrode 4, and a 1 μm thick SiO$_2$ insulation film was formed around the second electrode 4. Polyethylene was used for the radiator. As a gamma ray source, $^{60}$Co was used to obtain an energy spectrum of the detection signal of gamma rays. The applied voltage was a reverse voltage of 3 V.

A neutron detector of Comparative Example 1 having the structure shown in FIG. 8 was produced. The thickness of the Si semiconductor layer 102 was set to 380 μm. The second electrode 104 was the incident surface of charged particles derived from neutrons and gamma rays. The configuration of the electrode material was the same as in Example 1. Conditions of the gamma ray source and the applied voltage were the same as those in that Example 1.

Figure 5:
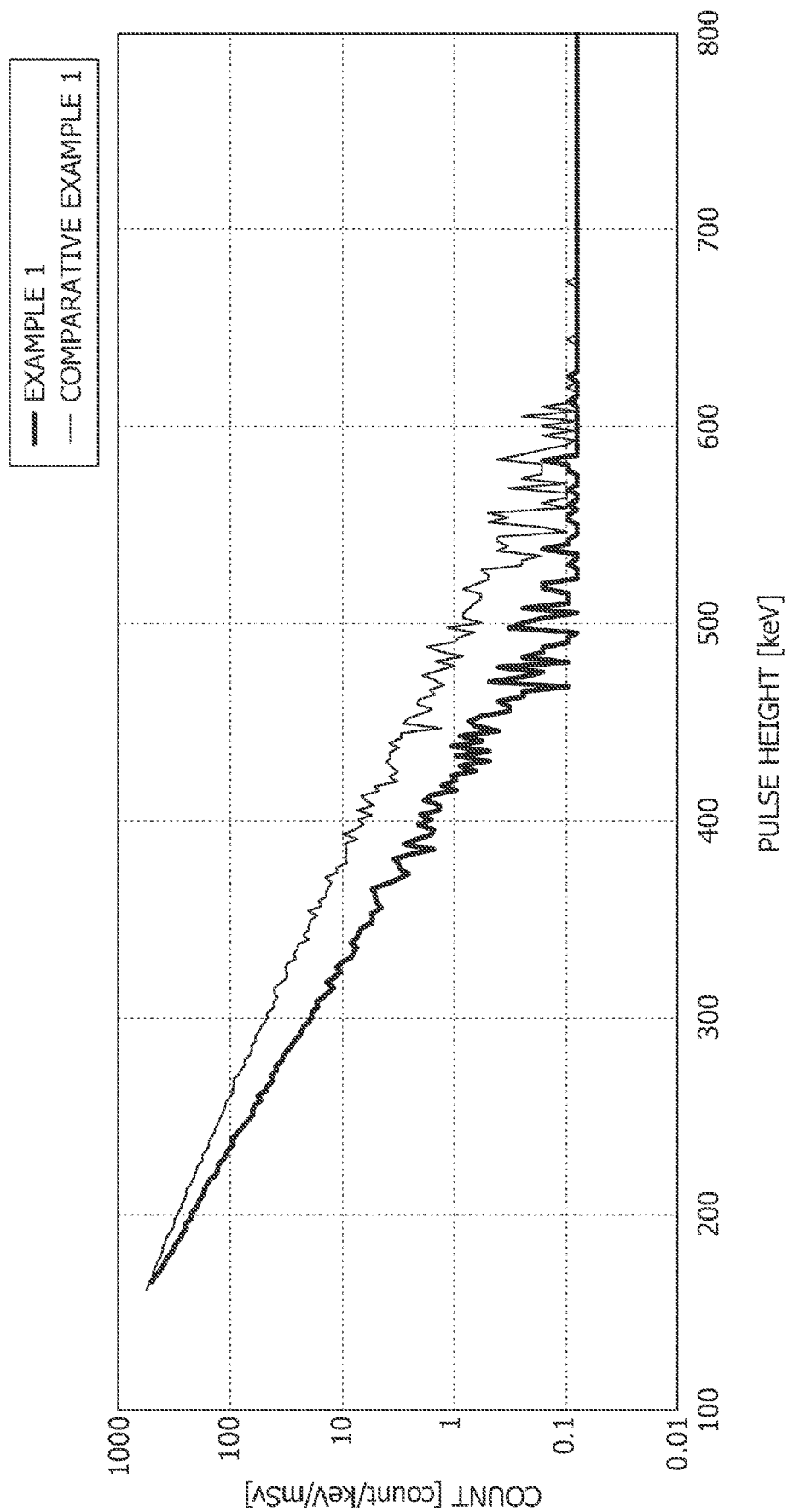
FIG. 5 is an energy spectrum of gamma rays measured using the neutron detector according to Example 1 and Comparative Example 1.

The results of measurement using the apparatus of Example 1 and Comparative Example 1 are shown in FIG. 5. From FIG. 5, it was confirmed that the spectrum shifted to lower energy when the thickness of the Si semiconductor layer was changed from 380 μm to 40 μm. In conventional detection of neutrons, neutrons have been detected while setting the threshold in high energy regions in which the influence of gamma rays is small in order to avoid erroneous detection caused by detection of signals of gamma rays. In contrast to this, it was confirmed that the threshold can be set lower by using a thin neutron detector having a thickness of about 40 μm.

Figure 6:
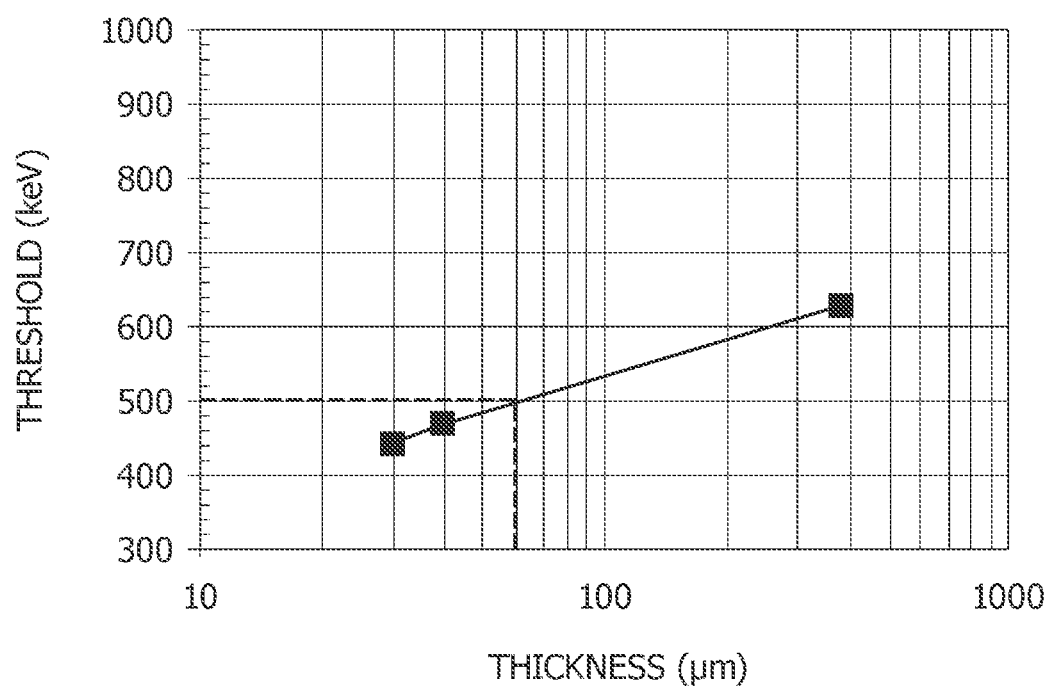
FIG. 6 is a graph showing the relationship between the thickness of the element of the neutron detector and the threshold of energy, which has been calculated based on the energy spectrum shown in FIG. 5.

The energy spectrum of the detection signals of gamma rays was measured in the same manner as in FIG. 5 using a neutron detector having an Si semiconductor layer of 30 μm (results not shown). The correlation between the threshold in the case in which the mixing ratio of gamma rays was set to be not more than 5%, and the thickness of the Si semiconductor layer was determined based on the above results and FIG. 5. The results are shown in FIG. 6. The "thickness" on the horizontal axis of FIG. 6 indicates the thickness of the Si semiconductor layer 2 shown in FIG. 1. According to the correlation in FIG. 6, it was confirmed that it is particularly preferable to set the thickness of the Si semiconductor layer of the neutron detector to not more than 60 μm in order to obtain an energy threshold of not more than 0.5 MeV.

The sensitivities of detection for neutrons with energies of 565 keV and 1,200 keV were compared using the neutron detector of Example 1 and Comparative Example 1, and the results shown in the following Table 1 were obtained. Neutrons of 565 keV, which had not been detected before, could now be successfully measured by using the neutron detector of Example 1. Furthermore, at 1,200 keV, a sensitivity of detection 10 times greater than before was obtained.

TABLE 1

|  | Count/(n/cm$^2$) | |
| --- | --- | --- |
|  | 565 keV | 1200 keV |
| Comparative Example 1 | — | 1.03E−05 |
| Example 1 | 4.92E−06 | 9.51E−05 |

Example 2, Comparative Example 2

A neutron detector of Example 2 was produced in the same manner as for Example 1, except for using a LiF sheet having a thickness of 0.05 μm as the radiator. Similarly, a neutron detector of Comparative Example 2 was produced in the same manner as for Comparative Example 1, except for using a LiF sheet having a thickness of 0.05 μm as the radiator.

Figure 7:
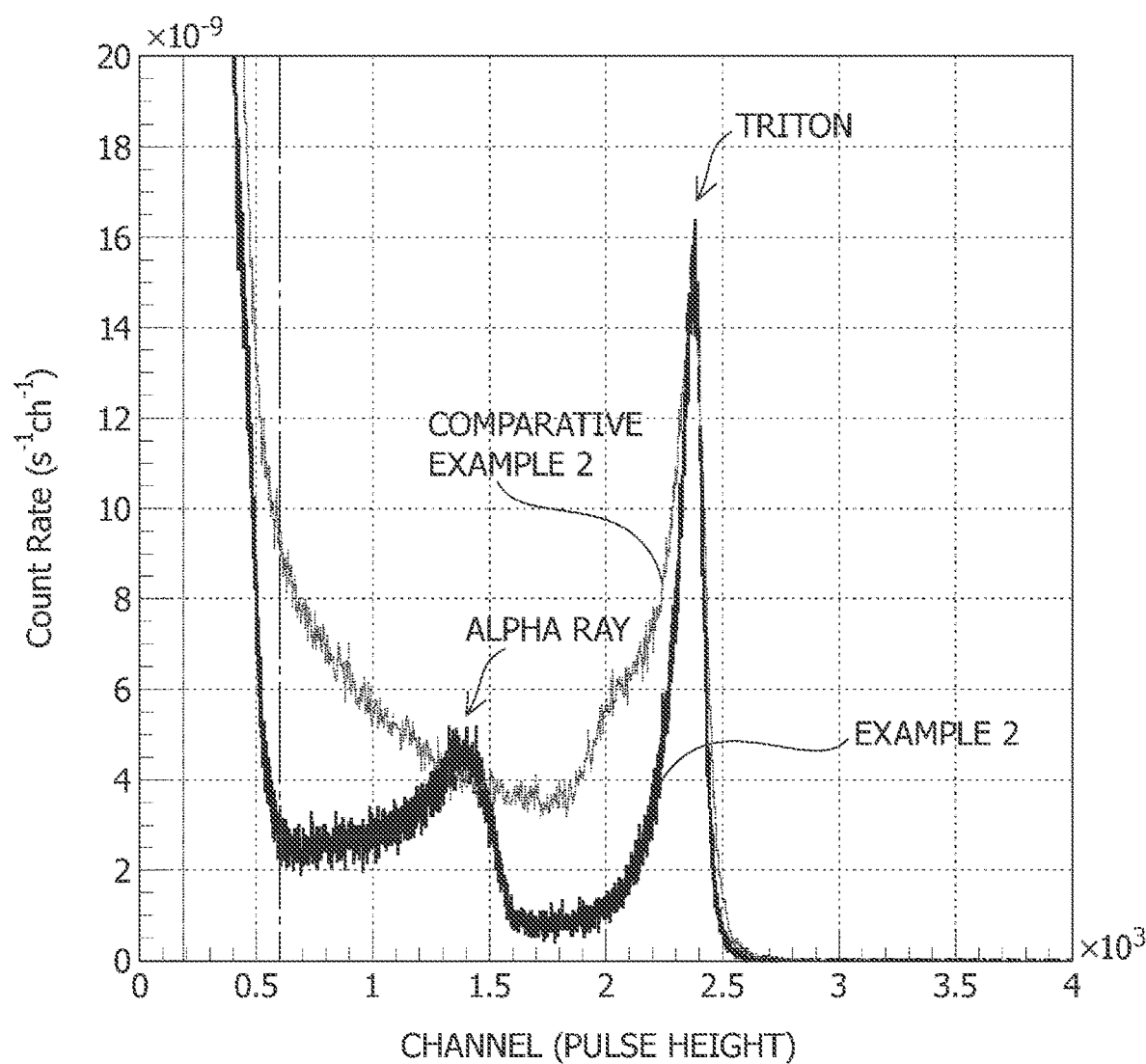
FIG. 7 is an energy spectrum of neutrons measured using the neutron detector according to Example 2 and Comparative Example 2.

Thermal neutrons were allowed to enter into the respective neutron detectors of Example 2 and Comparative Example 2 by applying a reverse voltage of 8V between the first electrode and the second electrode, and charge was counted. The results are shown in FIG. 7. In FIG. 7, a peak derived from tritons was found at about channel 2.4 for both the detectors of Example 2 and Comparative Example 2. In the figure, the long-dash dotted line at about channel 0.6 indicates the discrimination level. The energy resolution was improved by the apparatus of Example 3, and a clear peak derived from alpha rays was found at about channel 1.4.

INDUSTRIAL APPLICABILITY

The neutron detector of the present invention may be used in the fields of nuclear energy, in industry, in medicine, and so on. More specifically, the neutron detector can be applied to electronic personal dosemeters for use in nuclear energy, accelerators, and aerospace. In the field of medicine, the neutron detector can be applied to neutron fluence monitors for monitoring neutrons with which a human body is irradiated in boron neutron capture therapy.

REFERENCE SIGNS LIST

1 First electrode, 1a Al electrode, 1b Ti electrode
2 Si semiconductor layer, 2a P-type impurity region, 2b N-type impurity region
4 Second electrode, 6 Conductive bonding material, 7 Third electrode,
8, 11 Radiator
9a First detecting element, 9b Second detecting element
n Neutron, P Housing, S, G Terminal
10 Inverted-type neutron detector
20 Sandwich-type neutron detector

What is claimed is:

1. A neutron detector to detect neutrons, comprising:
a first detecting element comprising:
   a Si semiconductor layer;
   a first electrode formed on a main surface of the Si semiconductor layer configured to function as an incident surface; and
   a second electrode formed on an other main surface of the Si semiconductor layer opposite the incident surface and configured to detect charge of charged particles produced by the neutrons,
wherein the Si semiconductor layer comprises a P-type impurity region in contact with the second electrode and an N-type impurity region in contact with the first electrode; and
a radiator arranged to face the first electrode.

2. The neutron detector according to claim 1, wherein the Si semiconductor layer has a thickness of not greater than 100 μm.

3. The neutron detector according to claim 1, wherein the first electrode comprises a stacked body of Al and Ti, and the Ti is provided in contact with the Si semiconductor layer.

4. The neutron detector according to claim 1, wherein the neutron detector is for detecting neutrons with an energy of 0.5 MeV to 1 MeV.

5. The neutron detector according to claim 1, wherein the radiator comprises a compound containing $^{10}$B or $^{6}$Li and/or a polymer compound containing a hydrogen atom.

6. The neutron detector according to claim 1, wherein
the radiator comprises a compound containing $^{10}$B or $^{6}$Li,
the neutron detector further comprises a second detecting element on a side opposite to the first detecting element with the radiator interposed therebetween, and
the first electrode of the first detecting element is arranged to face a first main surface of the radiator, and the first electrode of the second detecting element is arranged to face a second main surface of the radiator.

7. A personal dosemeter comprising the neutron detector according to claim 1.

8. A neutron fluence monitor comprising the neutron detector according to claim 1.

9. A neutron detection method using the neutron detector according to claim 1, the method comprising:
allowing a charged particle, in response to incidence of a neutron, to enter into a depletion layer formed in the N-type impurity region from a side of the first electrode; and
detecting a charge generated in the depletion layer.

10. A personal dosemeter comprising the neutron detector according to claim 6.

* * * * *